Patented Sept. 13, 1932                                    1,876,661

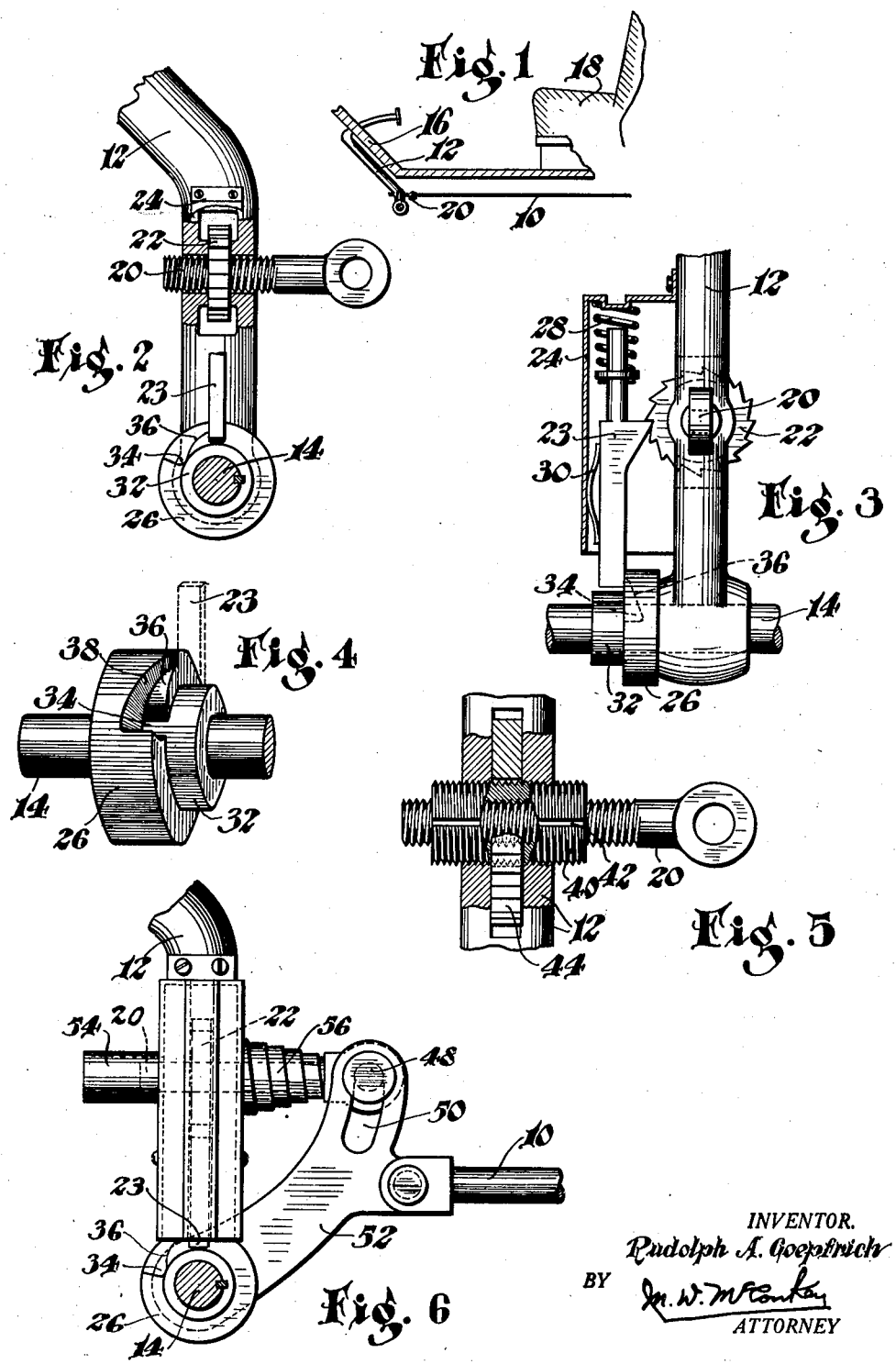

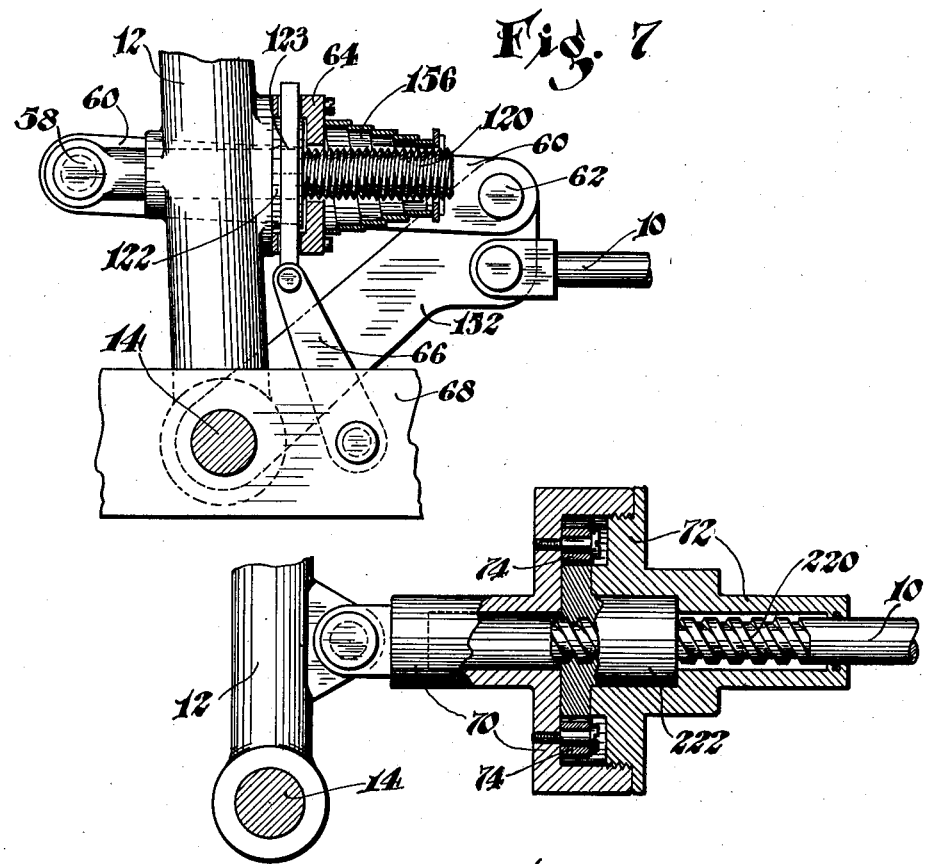

UNITED STATES PATENT OFFICE

RUDOLPH A. GOEPFRICH, OF SOUTH BEND, INDIANA, ASSIGNOR TO BENDIX BRAKE COMPANY, OF SOUTH BEND, INDIANA, A CORPORATION OF ILLINOIS

BRAKE SLACK ADJUSTER

Application filed February 23, 1929. Serial No. 341,891.

This invention relates to operating mechanism for brakes or the like, and is illustrated as embodied in pedal-operated connections from the service brake pedal of an automobile. An object of the invention is to provide simple and inexpensive means for adjusting, preferably automatically, the linkage operated by the pedal or its equivalent, to take up any slack due to wear or other causes.

In the drawings the invention is shown embodied, in several illustrative forms, in novel connections from the pedal including a ratchet-operated nut threaded on the end of the brake pull-rod, or an equivalent part. The nut is operated by a pawl mounted on the pedal and engaging a novel cam, or linked to a fixed part which operates it when the pedal is depressed.

Various other features relate to the structure of the nut and ratchet and to their mounting, especially to one arrangement in which there is a differentially-threaded member giving a quicker throw to the adjustment, to a simple collapsible housing for the adjustment, and to other novel and desirable details which will be apparent from the following description of the several constructions shown in the accompanying drawings, in which:

Figure 1 is a diagrammatic section of part of an automobile chassis, showing the pedal arrangement;

Figure 2 is a side elevation of the lower part of the pedal, on a larger scale, broken away to show the adjustment;

Figure 3 is a rear elevation of the parts shown in Figure 2, looking from the right toward the left in Figure 2;

Figure 4 is a perspective of the pawl-operating cam;

Figure 5 is a view corresponding to part of Figure 2, but showing a modification including the above-mentioned differentially-threaded device;

Figure 6 is a side elevation of the bottom of a pedal having a somewhat different type of connection from the adjustment;

Figure 7 is a side elevation showing a further modification, partly broken away in section to show the structure of the adjustment; and Figure 8 is a similar view of another modification.

As shown in Figure 1, my invention is capable of use in connecting the pullrod 10, or the equivalent part, of a brake-operating linkage to the usual service pedal or lever 12 loosely pivoted or fulcrumed on a shaft or the like 14 and projecting upwardly through the floorboard 16 in front of the driver's seat 18.

In the arrangement of Figures 2-4, the pull rod 10 has a threaded part 20 adjacent the pedal, on which is threaded a nut 22 mounted in a slot in the pedal level 12. Nut 22 is formed externally with a suitable operating ratchet, the teeth of which are engaged by a pawl 23 in the form of a plunger arranged in a housing 24 secured to the pedal, so that the pawl is carried by and moves with the pedal.

Pawl 23 is urged downwardly, against a cam 26 keyed to the shaft 14 so that it does not move with the pedal, by means such as a coil spring 28 confined between the top of casing 24 and a stop formed on or secured to the pawl. A leaf spring 30 compressed between pawl 23 and the side of the casing not only urges the pawl against the ratchet, but also urges the lower end of the pawl sidewise against the cam. In normal operation, the lower end of pawl 23 rides on a cylindrical portion or collar 32 of the cam and therefore does not operate the nut 22. If, however, the pedal is depressed through more than a predetermined angle, spring 30 shifts the lower end of the pawl into a notch 34 which then comes opposite it, and when the pedal is released the pawl rides up on a cam surface 36 which lifts it against the resistance of spring 28 to turn the nut 22 a distance corresponding to one ratchet tooth. The cam is formed with an inclined surface 38 which engages the side of the pawl at this time and which pushes the pawl off the cam surface 36 when the pedal reaches its initial position, back onto the cylindrical portion 32.

In the arrangement of Figure 5, there is threaded on part 20 an internally and externally differentially threaded device 40 threaded into an opening in pedal 12 and formed with a key slot 42 engaging a key on a ratchet member 44 operated by the above-described pawl 23. In this arrangement, as the device 40 is turned by the ratchet it threads itself axially toward the left in Figure 5, and at the same time draws part 20 toward the left with respect to itself, thus giving part 20 a double movement which greatly increases its throw.

In the arrangement of Figure 6, part 20 has at its end a pin 48 riding in a curved slot 50 in a connecting arm 52 to which the pull-rod 10 is pivoted and which is loosely mounted on shaft 14. The adjustment operates as described above to pull arm 52 toward the pedal 12. The pedal in this case has a closed sheet-metal socket 54 into which the end of part 20 advances as the adjustments are made from time to time, and the exposed portion of part 20 is inclosed by a housing 56 of a helically-wound spiral of spring or resilient material such as spring steel, compressed between pedal 12 and arm 52 and collapsed gradually as the successive adjustments draw arm 52 toward pedal 12.

In the arrangement of Figure 7, the threaded part 120, housed in a spiral 156, passes through the pedal and is connected by a pivot 58 to a link 60 connected by another pivot 62 to an arm 152 corresponding to arm 52. In this case a nut 122, formed with ratchet teeth, is threaded on part 120 in a housing 64 secured to the pedal, and is operated by a pawl 123 in the form of a plunger guided in openings in the housing 64 and operated by means such as a link 66 pivoted at one end to the pawl and at the other end to a fixed part such as a chassis frame member 68.

In Figure 8, pedal 12 is pivoted to a housing formed as two parts 70 and 72 threaded together, and which contains a nut 222 threaded on a part 220 at the end of rod 10 and formed with ratchet teeth operated by the pawl 123 described above. Holding teeth 74 spring pressed against the ratchet may be pivoted in the housing to prevent retrograde movement of the adjustment. Such holding teeth may also be provided in the other illustrated forms if desired, but ordinarily are not needed, as the friction of the parts is sufficient to prevent accidental displacement.

While several illustrative embodiments have been described in detail, it is not my intention to limit the scope of the invention to those particular embodiments, or otherwise than by the terms of the appended claims.

I claim:

1. Operating mechanism comprising a pedal and pedal-operated means and an automatically-adjustable connection therebetween including, in combination therewith, a threaded member connected to said means, a nut threaded on said member and connected to the pedal, said nut having a ratchet, a pawl associated and moving with the pedal and engaging the ratchet, and a cam held from movement with the pedal and engaging the pawl and operated by movement of the pawl with the pedal beyond a predetermined angle to operate the pawl to move the ratchet forward one tooth.

2. Operating mechanism comprising a pedal and pedal-operated means and an automatically-adjustable connection therebetween including, in combination therewith, a threaded member connected to said means, a nut threaded on said member and connected to the pedal, said nut having a ratchet, a pawl associated with the pedal and engaging the ratchet, and means arranged adjacent the axis of movement of the pedal and engaging the pawl and operated by movement of the pedal beyond a predetermined angle to operate the pawl to move the ratchet forward one tooth.

3. Operating mechanism comprising, in combination, a lever, a cam adjacent the fulcrum of the lever and held from movement with the lever, operated means including a threaded part, a nut connected to the lever and threaded on said part and having a ratchet, a pawl engaging the ratchet and said cam, and a spring holding the pawl yieldingly in engagement with the ratchet and cam, the cam having a part holding the pawl in a non-operable position during a predetermined throw of the lever and then permitting it to be shifted by the spring into a different position and having another part operatively engaging the pawl during release movement of the lever after the pawl has been so shifted and which other part operates the pawl to shift the ratchet forward to turn the nut to take up on said operated means.

4. Operating mechanism comprising, in combination, a lever, a cam adjacent the fulcrum of the lever and held from movement with the lever, operated means including a threaded part, a nut connected to the lever and threaded on said part and having a ratchet, and a pawl engaging the ratchet and said cam and which is operated by the cam to turn the nut to take up on said operated means.

5. Operating mechanism comprising, in combination, a lever element, an operated element, one of said elements having a threaded part and the other having a nut threaded on said part and provided with a ratchet, and a pawl having an actuating cam at the axis of movement of said lever element and which is arranged for operating the ratchet to turn the nut when said lever is operated beyond a predetermined throw.

6. Operating mechanism comprising, in combination, a lever, an operated element, an automatically-adjustable connection between the lever and said element, and a housing for said connection including a compressible helically-wound spiral of resilient material.

7. Operating mechanism comprising, in combination, a lever, an operated element having a threaded part, an adjustable nut carried by the lever and threaded on said part, a housing for said part including a compressible helically-wound spiral of resilient material surrounding said part, and a closed tubular socket into which the end of said part advances as the nut is operated.

8. Operating mechanism comprising, in combination, a lever, an operated element having a threaded part, a nut moving with and connected to the lever and threaded on said part and provided with a ratchet, a pawl engaging the ratchet, and means for holding the pawl as the lever is moved and thereby operate the ratchet when the lever is oscillated over more than a predetermined arc.

9. Operating mechanism comprising, in combination, a lever, an operated element having a threaded part, a nut threaded on said part, automatically-operated means for turning the nut for taking up on the operated element, and a housing connected to the lever and enclosing the nut and said means and with said nut acting as a tension connection between the lever and said element.

10. Operating mechanism comprising, in combination, a lever element, an operated element, both of said elements having threaded portions, an operating device having differential external and internal threads engaging respectively with said threaded portions, and means for operating said device to take up on the operated element.

11. Operating mechanism comprising, in combination, a lever element, an operated element, both of said elements having threaded portions, an operating device having differential external and internal threads engaging respectively with said threaded portions, a ratchet for operating said device to take up on the operated element, and an automatically-operated pawl for actuating said ratchet.

12. Operating mechanism comprising, in combination, a lever, an operated element having a threaded part, a nut moving with and connected to the lever and threaded on said part and provided with a ratchet, a pawl engaging the ratchet, and a tension element pivoted to the pawl at one end and pivoted on a fixed part at the other end for holding the pawl as the lever is moved and thereby operate the ratchet when the lever is oscillated over more than a predetermined arc.

13. Operating mechanism comprising, in combination, a lever, an operated element having a threaded part, a nut threaded on said part, automatically-operated means for turning the nut for taking up on the operated element, and a housing pivoted to the lever and enclosing the nut and said means and with said nut acting as a tension connection between the lever and said element.

In testimony whereof, I have hereunto signed my name.

RUDOLPH A. GOEPFRICH.